United States Patent
DeGroat et al.

(10) Patent No.: US 6,449,110 B1
(45) Date of Patent: Sep. 10, 2002

(54) OPTIMIZING OPERATION OF A DISK STORAGE SYSTEM BY INCREASING THE GAIN OF A NON-LINEAR TRANSDUCER AND CORRECTING THE NON-LINEAR DISTORTIONS USING A NON-LINEAR CORRECTION CIRCUIT

(75) Inventors: Ronald D. DeGroat, Lakewood; William G. Bliss, Thornton, both of CO (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/244,082

(22) Filed: Feb. 3, 1999

(51) Int. Cl.[7] .................................................. G11B 5/09

(52) U.S. Cl. ............................ 360/46; 360/65; 360/67; 360/31; 360/53; 360/66

(58) Field of Search ............................ 360/46, 65, 67, 360/68, 31, 53, 66; 324/212, 226; 375/345, 232, 236; 714/770, 774

(56) References Cited

U.S. PATENT DOCUMENTS

| | | | |
|---|---|---|---|
| 5,283,521 A | 2/1994 | Ottesen et al. | |
| 5,418,660 A | 5/1995 | Sato et al. | |
| 5,744,993 A | 4/1998 | Sonntag | |
| 5,754,353 A | * 5/1998 | Behrens et al. | 360/53 |
| 5,790,335 A | 8/1998 | Sugawara et al. | |
| 5,872,668 A | 2/1999 | Muto | |
| 5,970,091 A | * 10/1999 | Nishida et al. | 375/231 |

OTHER PUBLICATIONS

Peter M. Clarkson, *OPtimal and Adaptive Signal Processing*, chapter 6.2.10 "LMS Volterra Filter", pp. 301–307, CRC Press, Inc., 1993.

Martin Schetzen, *The Volterra and Wiener Theories of Nonlinear Systems*, Chapter 5.4–1 "Suppression of Kernels", pp. 86–87, Robert E. Krieger Publishing Co., Inc., 1989.

Dean Palmer et al., "Characterization of the Read/Write Process for Magnetic Recording", *IEEE Transactions on Magnetics*, vol. 31, No. 2, Mar. 1995.

B. Wilson and S. Wang, "Generalized Method for Measuring Read–Back Nonlinearity Using a Spin Stand", *Journal of Applied Physics*, 81(8), Apr. 15, 1997.

(List continued on next page.)

*Primary Examiner*—Alan T. Faber
(74) *Attorney, Agent, or Firm*—Dan A. Shifrin, Esq.

(57) ABSTRACT

A sampled amplitude read channel is disclosed for magnetic disk storage systems utilizing a read head exhibiting a non-linear response such as a magneto-resistive (MR) read head. A sensor of the read head is adjusted to operate in a region of its response that provides optimum gain even though it may be a region of higher non-linearity. To compensate for the non-linearity introduced into the read signal, the read channel further comprises an adaptive non-linear correction circuit that is adaptively tuned by a least-mean-square (LMS) adaptation circuit. The analog read signal is sampled and the discrete time samples equalized into a desired partial response prior to sequence detection. The non-linear correction circuit is inserted into the read path prior to the sequence detector in order to attenuate the non-linear distortions that would otherwise degrade the performance of the sequence detector. A channel quality circuit integrated into the read channel measures and accumulates a predetermined error metric, such as a squared sample error or a bit error, that is used to optimize the adjustment of the sensor in the read head. By iteratively adjusting the sensor and adaptively tuning the non-linear correction circuit, an optimum sensor setting that minimizes the accumulated error metric is determined, saved, and then used as the operating setting during normal operation of the magnetic disk storage system.

28 Claims, 9 Drawing Sheets

OTHER PUBLICATIONS

D. Palmer and P. Ziperovich, "Identification of Nonlinear Write Effects Using Psuedorandom Sequences", *IEEE Transactions on Magnetics*, vol. Mag–23, No. 5, Sep. 1987.

J.W.M. Bergmans et al., "Dual–DFE Read/Write Channel IC for Hard–Disk Drives", *IEEE Transactions on Magnetics*, vol. 34, No. 1, Jan. 1998.

* cited by examiner

OPTIMIZING OPERATION OF A DISK STORAGE SYSTEM BY INCREASING THE GAIN OF A NON-LINEAR TRANSDUCER AND CORRECTING THE NON-LINEAR DISTORTIONS USING A NON-LINEAR CORRECTION CIRCUIT

CROSS REFERENCE TO RELATED APPLICATIONS AND PATENTS

This application is related to another U.S. patent application, namely application Ser. No. 08/640,410, now U.S. Pat. No. 5,949,355 entitled "GAIN AND PHASE CONSTRAINED ADAPTIVE EQUALIZING FILTER IN A SAMPLED AMPLITUDE READ CHANNEL FOR MAGNETIC RECORDING." This application is also related to several U.S. patents, namely U.S. Pat. No. 5,291,499 entitled "METHOD AND APPARATUS FOR REDUCED-COMPLEXITY VITERBI-TYPE SEQUENCE DETECTORS," U.S. Pat. No. 5,696,639 entitled "SAMPLED AMPLITUDE READ CHANNEL EMPLOYING INTERPOLATED TIMING RECOVERY," U.S. Pat. No. 5,424,881 entitled "SYNCHRONOUS READ CHANNEL," U.S. Pat. No. 5,585,975 entitled "EQUALIZATION FOR SAMPLE VALUE ESTIMATION AND SEQUENCE DETECTION IN A SAMPLED AMPLITUDE READ CHANNEL," U.S. Pat. No. 5,761,212 entitled "CHANNEL QUALITY," and U.S. Pat. No. 5,754,353 entitled "CHANNEL QUALITY CIRCUIT IN A SAMPLED AMPLITUDE READ CHANNEL." All of the above-named patent applications and patents are assigned to the same entity, and all are incorporated herein by reference.

FIELD OF INVENTION

The present invention relates to the recording and reproduction of binary data in magnetic disk storage systems for digital computers, particularly to a magnetic disk storage system employing a non-linear transducer (e.g., a magneto-resistive (MR) read head adjusted to operate in a non-linear region but with higher gain, together with a non-linear correction circuit for attenuating the non-linearity in the read signal.

BACKGROUND OF THE INVENTION

Computer systems typically comprise a disk storage device, for example a magnetic or optical disk drive, which provide an inexpensive means to store large amounts of digital data in a non-volatile manner. The disk storage device is essentially a communication system where the storage medium (magnetic or optical), transducer, and read/write electronics constitute the communication channel. Similar to other communication channels, the digital data in storage devices is "transmitted" through the channel by modulating an analog signal. In magnetic disk storage systems, for example, the digital data modulates the current in an inductive write coil in order to write a sequence of magnetic transitions onto the surface of a magnetic disk in concentric, radially spaced tracks. And in optical disk storage systems, the digital data may modulate the intensity of a laser beam in order to write a series of "pits" onto the surface of an optical disk in tracks that spiral inward toward the center of the disk.

During a read operation, a transducer or read head is positioned in close proximity to the surface of the disk, and while the disk spins under the read head, the read head senses the alterations (magnetic or optical) representing the digital data. The read head generates an analog read signal comprising pulses induced by the surface alterations. In magnetic recording, for example, the read head comprises a sensor that is responsive to the changes in the magnetic flux caused by the magnetic transitions representing the digital data. The two main types of magnetic sensors employed in magnetic storage devices include the conventional inductive coil read head which is sensitive to the change in magnetic flux, and the more recent magneto-resistive (MR) read head comprising a resistive element which is sensitive to the strength or magnitude of the magnetic flux. Both sensors generate an analog read signal comprising pulses induced by the magnetic transitions, but the MR read head exhibits substantially higher sensitivity and noise immunity which is why they are displacing the older inductive coil type read heads.

As with other bandlimited communication channels, the maximum capacity of a disk storage system is approximated by Shannon's equation for the capacity of an additive white Gaussian noise channel:

$$C = W \log\left(1 + \frac{P}{N_0 W}\right).$$

In the above equation, W is the channel bandwidth, $N_0$ is the noise power spectrum, and P is the signal power. The bandwidth W of a disk storage system is, for the most part, limited by the characteristics of the storage medium. Thus, once the storage medium is chosen, the maximum capacity of the storage system is essentially a function of the signal power P and the noise power $N_0$ (i.e., the signal-to-noise ratio or SNR). Certain characteristics of the storage medium also contribute to the noise power in the read signal, so designers generally choose the least expensive medium that will provide the highest bandwidth and SNR to attain maximum storage capacity.

In addition to innovations in the storage medium itself, attempts to increase storage capacity generally focus on improving the actual SNR through improvements to the transducer and drive electronics, as well as improving the effective SNR through the use of error correction codes (ECC), such as the Reed-Solomon ECC codes, and through the use of sophisticated signal processing techniques spawned by communication theory.

One such advancement in communication theory that has recently been applied to disk storage systems to achieve significant gains in storage capacity is partial response (PR) signaling with maximum likelihood (ML) sequence detection. Partial response signaling refers to a particular method for transmitting symbols represented as analog pulses through a communication medium. The benefit is that at the signaling instances (baud rate) there is no intersymbol interference (ISI) from other pulses except for a controlled amount from immediately adjacent, overlapping pulses. Allowing the pulses to overlap in a controlled manner leads to an increase in the symbol rate (linear recording density) without sacrificing performance in terms of SNR. Stated differently, a partial response signal provides an increase in the effective SNR by making more efficient use of the channel bandwidth.

Figure 1A:
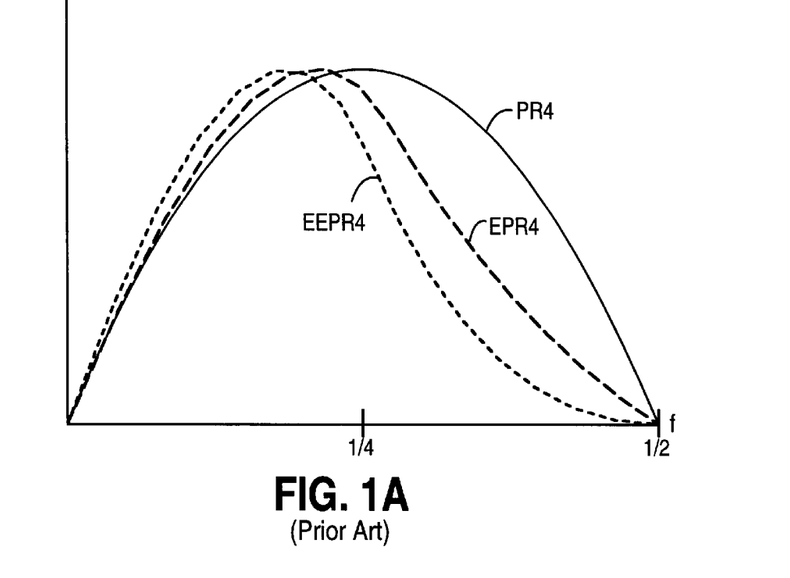
FIG. 1A shows the frequency response for a PR4, EPR4 and EEPR4 read channel.
Figure 1B:
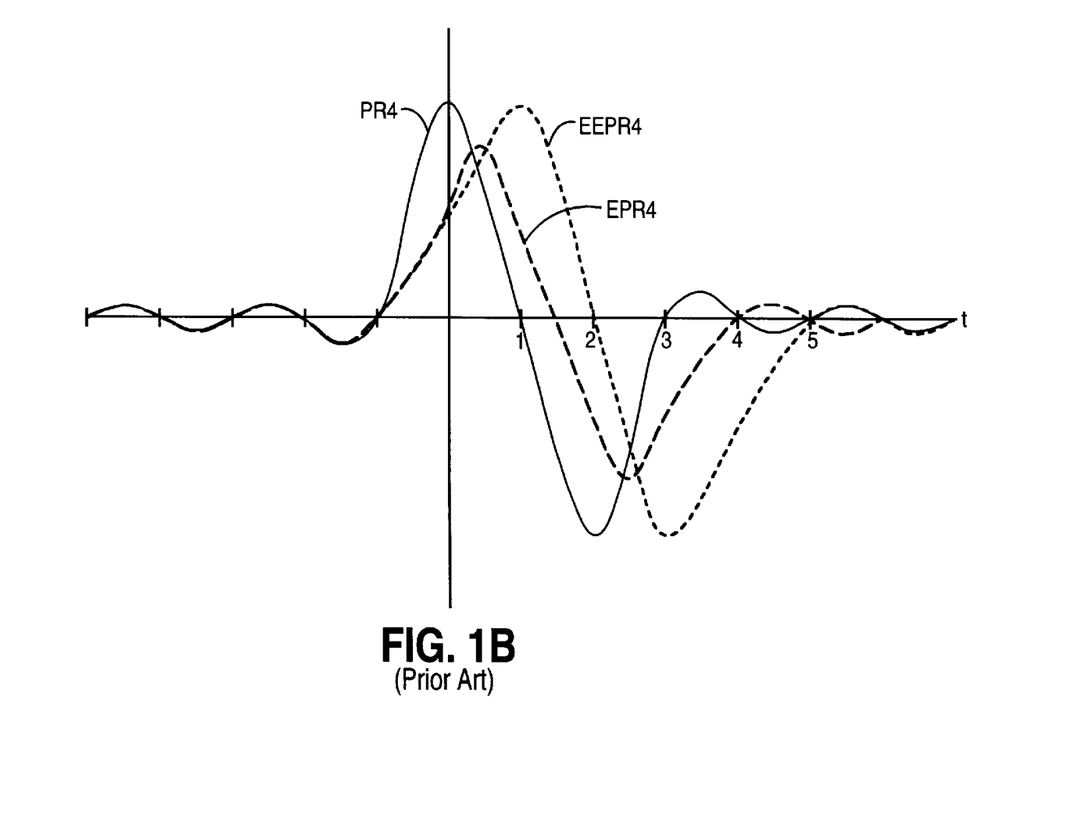
FIG. 1B shows the dipulse responses for the PR4, EPR4 and EEPR4 read channels of FIG. 1A.

Partial response channels are characterized by the polynomials $$(1-D)(1+D)^n$$

where D represents a delay of one symbol period and n is an integer. For n=1, 2, 3, the partial response channels are referred to as PR4, EPR4 and EEPR4, with their respective frequency responses shown in FIG. 1A. The channel's dipulse response, the response to an isolated symbol, characterizes the transfer function of the system (the output for a given input). With a binary "1" bit modulating a positive dipulse response and a binary "0" bit modulating a negative dipulse response, the output of the channel is a linear combination of time shifted dipulse responses $$y(t)=\Sigma a_n p(t-nT)$$

where $a_n$ denotes the write current symbols +1 and −1 at time n and p(t) represents the channel's dipulse response shifted by nT (n symbol periods). The dipulse response for a PR4 channel $(1-D^2)$ is shown as a solid line in FIG. 1B. Notice that at the symbol instances (baud rate), the dipulse response is zero except at times t=0 and t=2. Thus, the linear combination of time shifted PR4 dipulse responses will result in zero ISI at the symbol instances except where immediately adjacent pulses overlap.

It should be apparent that the linear combination of time shifted PR4 dipulse responses will result in a channel output of +2, 0, or −2 at the symbol instances (with the dipulse samples normalized to +1, 0, −1) depending on the binary input sequence. The output of the channel can therefore be characterized as a state machine driven by the binary input sequence, and conversely, the input sequence can be estimated or demodulated by running the signal samples at the output of the channel through an "inverse" state machine. Because noise will obfuscate the signal samples, the inverse state machine is actually implemented as a trellis sequence detector which computes a most likely input sequence associated with the signal samples. The algorithm for selecting a most likely sequence through a trellis was invented by a man named Viterbi, and thus the algorithm is commonly referred to as the Viterbi algorithm.

Figure 2A:
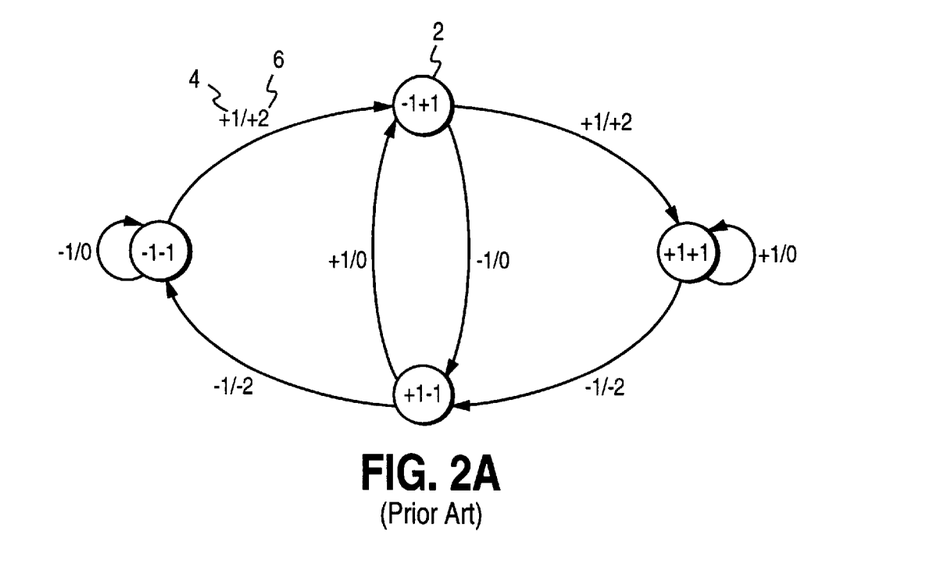
FIG. 2A is a state transition diagram for a PR4 sequence detector.

The Viterbi algorithm for a PR4 trellis sequence detector is understood from its state transition diagram shown in FIG. 2A. Each state 2 is represented by the last two input symbols (in NRZ after preceding), and each branch from one state to another is labeled with the current input symbol in NRZ 4 and the corresponding sample value 6 it will produce during readback. The demodulation process of the PR4 sequence detector is understood by representing the state transition diagram of FIG. 2A as a trellis diagram shown in FIG. 2B. The trellis diagram represents a time sequence of sample values and the possible recorded input sequences that could have produced the sample sequence. For each possible input sequence, an error metric is computed relative to a difference between the sequence of expected sample values that would have been generated in a noiseless system and the actual sample values output by the channel. For instance, a Euclidean metric is computed as the accumulated square difference between the expected and actual sample values. The input sequence that generates the smallest Euclidean metric is the most likely sequence to have created the actual sample values; this sequence is therefore selected as the output of the sequence detector.

To facilitate the demodulation process, the sequence detector comprises path memories for storing each of the possible input sequences and a corresponding metric. A well known property of the sequence detector is that the paths storing the possible input sequences will "merge" into a most likely input sequence after a certain number of sample values are processed, as long as the input sequence is appropriately constrained. In fact, the maximum number of path memories needed equals the number of states in the trellis diagram; the most likely input sequence will always be represented by one of these paths, and these paths will eventually merge into one path (i.e., the most likely input sequence) after a certain number of sample values are processed.

Figure 2B:
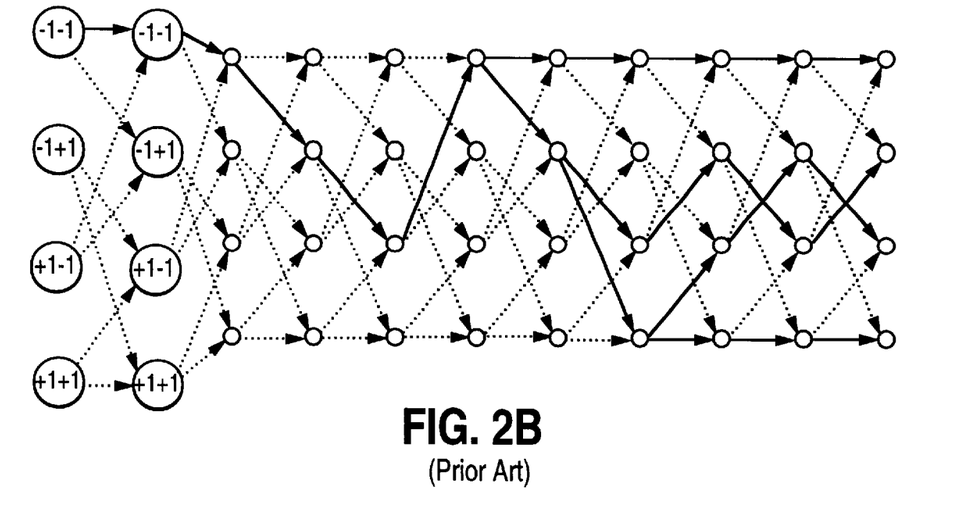
FIG. 2B is a trellis diagram corresponding to the PR4 state transition diagram of FIG. 2A showing the path memory and survivor sequence for a given input sequence.

The "merging" of path memories is understood from the trellis diagram of FIG. 2B where the "survivor" sequences are represented as solid lines. Notice that each state in the trellis diagram can be reached from one of two states; that is, there are two transition branches leading to each state. With each new sample value, the Viterbi algorithm recursively computes a new error metric and retains a single survivor sequence for each state corresponding to the minimum error metric. In other words, the Viterbi algorithm will select one of the two input branches into each state since only one of the branches will correspond to the minimum error metric, and the paths through the trellis corresponding to the branches not selected will merge into the paths that were selected. Eventually, all of the survivor sequences will merge into one path through the trellis which represents the most likely estimated data sequence to have generated the sample values as shown in FIG. 2B.

The performance of the trellis sequence detector in terms of bit error rate depends on the amount of noise in the system, including noise due to the spectrum of the read signal diverging from the ideal partial response. Linear distortions in the read signal can generally be suppressed using a linear equalizer which may operate on the continuous-time analog read signal or the discrete-time samples of the read signal. Typical read channels employ both an analog equalizer, such as a biquad analog filter, followed by a nth order finite-impulse response (FIR) discrete-time filter. Linear equalizers, however, are not effective in attenuating non-linear distortions in the read signal, such as asymmetries caused by the non-linear response of a magneto-resistive (MR) read head.

Figure 3:
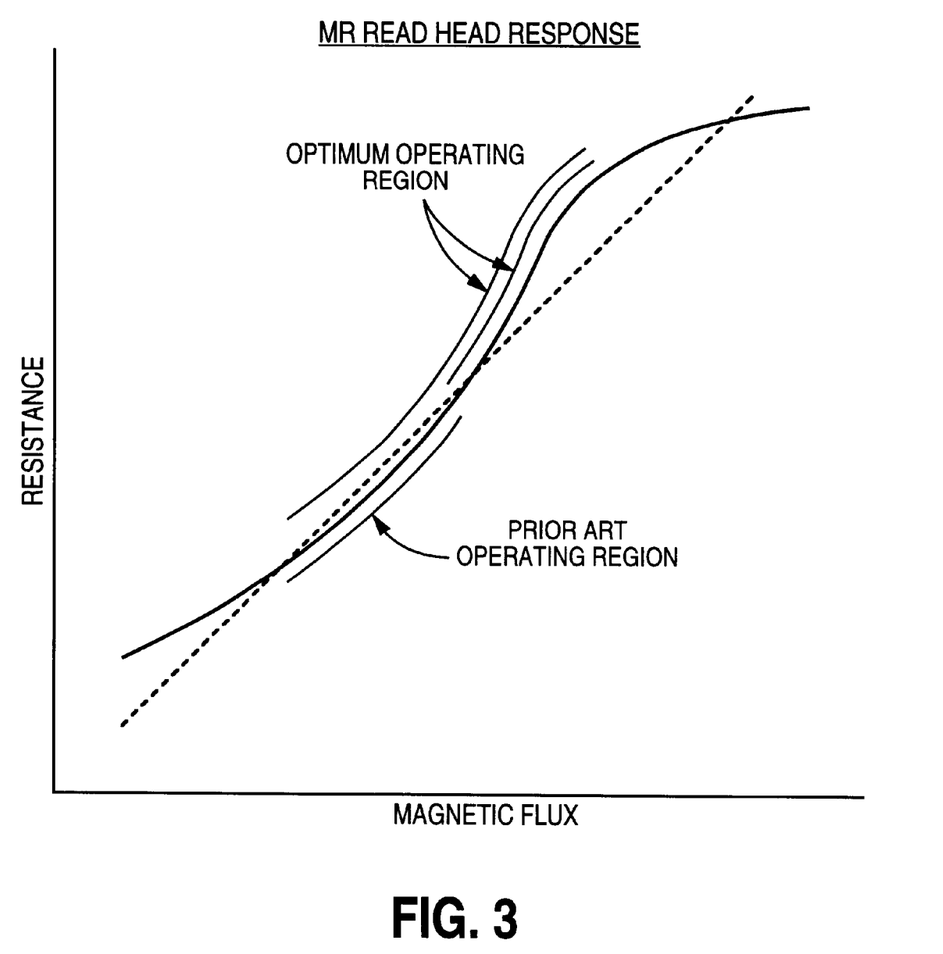
FIG. 3 shows an example response for a MR read head, that is, a plot of the resistance of the MR sensor element versus magnetic flux.

An MR read head comprises an MR sensor element with a resistance which is proportional to the strength of the magnetic flux; the read signal is generated by applying a current to the MR element and measuring the voltage across it as it passes over the magnetic transitions recorded on the disk. FIG. 3 is a plot of the head's resistance versus the magnetic flux which illustrates that the response can be very non-linear. The effect of this non-linearity on the read signal generally results in pulses that are not symmetric, for example, the magnitude of a pulse induced by a positive magnetic transition may be greater than the magnitude of a pulse induced by a negative magnetic transition (note that the asymmetry in the pulses may be reversed, and other asymmetries may also be present in the read signal). Ultimately, the non-linear distortions prevent the read signal from attaining the desired partial response target, introducing noise into the sample values which degrades the performance of the trellis sequence detector.

The undesirable non-linear characteristic of an MR read head has been ameliorated in prior art techniques by applying a magnetic biasing field across the MR element so that it operates in a linear region of the response while still providing sufficient sensitivity and stability. This is illustrated in FIG. 3 which shows that the prior art solution is to bias the MR sensor so that it operates near a linear region of its response. However, the linear region of the MR response may not be the region of highest gain, and therefore not necessarily the optimum operating region.

There is, therefore, a need for an improved sampled amplitude read channel for use in magnetic disk storage systems that provides a performance enhancing improvement by adjusting a non-linear read head to attain optimum sensitivity. In particular, it is an object of the present invention to optimize the operation of an MR read head to improve the performance and increase the capacity of a magnetic disk storage system.

SUMMARY OF THE INVENTION

A sampled amplitude read channel is disclosed for magnetic disk storage systems utilizing a read head exhibiting a non-linear response, such as a magneto-resistive (MR) read head. A sensor of the read head is adjusted to operate in a region of its response that provides optimum gain even though it may be a region of higher non-linearity. To compensate for the non-linearity introduced into the read signal, the read channel further comprises an adaptive non-linear correction circuit that is tuned to achieve the best overall performance. The analog read signal is sampled and the discrete time samples equalized into a desired partial response prior to sequence detection. The non-linear correction circuit is inserted into the read path prior to the sequence detector in order to attenuate the non-linear distortions that would otherwise degrade the performance of the sequence detector. A channel quality circuit integrated into the read channel measures and accumulates a predetermined error metric, such as a squared sample error or a bit error, that is used to optimize the adjustment of the sensor in the read head. By iteratively adjusting the sensor and tuning the non-linear correction circuit, an optimum sensor setting that minimizes the accumulated error metric is determined, saved, and then used as the operating setting during normal operation of the magnetic disk storage system.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Overview

Figure 4:
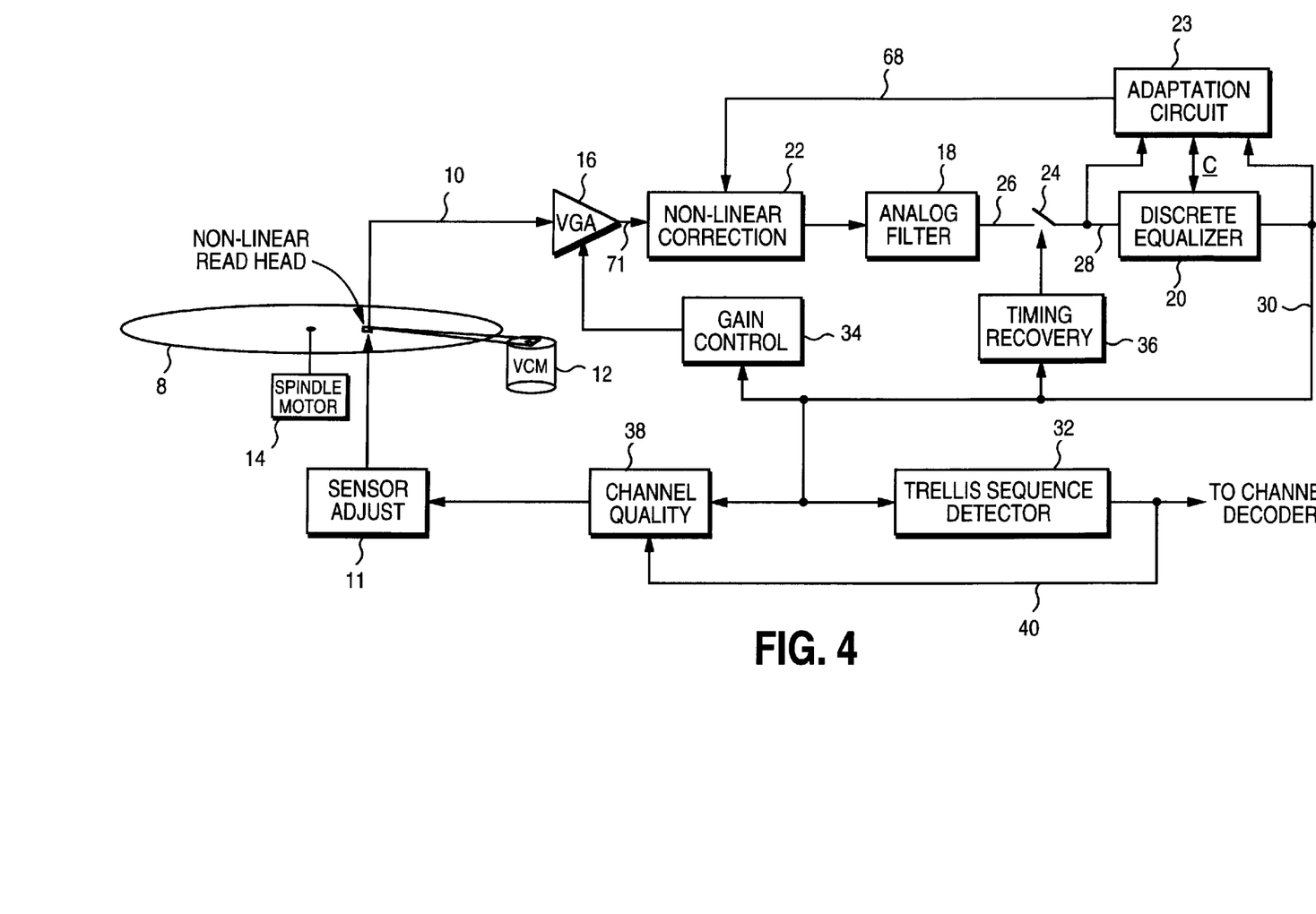
FIG. 4 is a block diagram of the read channel of the present invention, including a sensor adjust circuit for adjusting a non-linear sensor in the read head, a non-linear correction circuit for attenuating a non-linearity in the read signal caused by the non-linear sensor, and a channel quality circuit for measuring an error metric for use in iteratively adjusting the non-linear sensor to attain optimal performance.

The sampled amplitude read channel of the present invention is intended to operate within a magnetic disk storage device as illustrated in FIG. 4. A voice coil motor (VCM) 12 positions the read head over a desired data track of a magnetic disk 8, and a spindle motor 14 rotates the disk 8 at a very high velocity. A non-linear read head (e.g., an MR read head) transduces magnetic transitions recorded on the disk into an analog read signal 10 comprising polarity alternating pulses. A non-linear distortion is introduced into the read signal 10 by the non-linear read head, such as asymmetry distortion in the pulses caused by the non-linear response of an MR sensor element. A sensor adjust circuit 11 is provided within the read channel to adjust the sensor in the read head to operate in a desired operating region of its response. In prior art read channels, the sensor is adjusted to operate in a linear region of its response to attenuate the non-linearity in the read signal. As described in greater detail below, an aspect of the present invention is to operate the sensor in a region of higher gain and then to compensate for any increase in non-linearity using a non-linear correction circuit.

The read channel comprises circuitry for equalizing the read signal 10 into a desired partial response, including a variable gain amplifier (VGA) 16, an analog filter 18, and an adaptive linear discrete-time equalizer 20. Since the linear equalizer 20 cannot compensate for non-linear distortions in the read signal, the read channel further comprises an adaptive, non-linear correction circuit 22. In the preferred embodiment, the non-linear correction circuit 22 and discrete-time equalizer 20 are adjusted by an adaptation circuit 23 to compensate for variations in the non-linear and linear distortions that occur over time due to variations in fly-height, radial location of the head, temperature fluctuations, and other parameter variations in the recording system.

A sampling device 24 samples the analog read signal 26 at the output of the analog filter 18 to generate discrete-time samples 28 of the read signal that are equalized by the discrete-time equalizer 20 to generate equalized sample values 30. The sampling device 24 may be implemented as a simple sample and hold circuit, and the downstream components, such as the discrete-time equalizer 20, could be implemented using discrete-time analog (DTA) circuitry. Alternatively, the samples 28 of the read signal could be converted into digital values and the downstream components implemented using digital circuitry. In still another embodiment, the read channel could be implemented using a hybrid of DTA and digital circuits, for example, implementing the discrete-time equalizer 20 in DTA, converting the equalized samples 30 to digital values, and implementing the trellis sequence detector 32 with digital circuitry.

The equalized samples 30 are processed by a gain control 34 and a timing recovery circuit 36 which adjust the amplitude of the analog read signal 10 and frequency/phase of the sampling device 24, respectively. These circuits are decision-directed feedback loops which attempt to minimize an error between the actual signal samples 30 and estimated or ideal samples of the target partial response. Typically a simple slicer circuit (not shown) generates the estimated sample values of the target response. The timing recovery circuit 36 adjusts the frequency/phase of the sampling device 24 in order to synchronize the sampling of the analog read signal 26 to the baud rate. Alternatively, the analog read signal 26 could be sampled 24 asynchronously and the asynchronous sample values 28 interpolated to generate baud rate synchronous sample values (see the above referenced U.S. Pat. No. 5,696,639 incorporated by reference). After equalizing the read signal according to the desired partial response, synchronizing to the baud rate, and attenuating the non-linear distortions, the read signal samples 30 are demodulated by a trellis sequence detector 32 which computes an estimated binary sequence 40 most likely to have generated the read signal samples 30.

The adaptation circuit 23 implements a least-mean-square (LMS) adaptation algorithm for adapting the linear discrete-time equalizer 20 as well as the non-linear correction circuit 22. Preferably, the non-linear correction circuit 22 is implemented in the analog domain wherein the cost and complexity of the design can be significantly reduced. The non-linear correction circuit 22 comprises a simple second order response of the form $$x + \alpha x^2$$

which estimates the inverse response of the second order non-linearity caused by an MR read head. The LMS update for the coefficient $\alpha$ is estimated using the stochastic gradient computed for the center coefficient in the quadratic component of a Volterra filter, without actually implementing a Volterra filter.

A significant aspect of the present invention is to take maximum advantage of the non-linear correction circuit 22 since the circuitry is included in the read channel even in situations where the non-linearity can be substantially removed from the read signal by appropriately biasing the MR read head. Instead of adjusting the bias such that the MR read head operates in a linear region of its response, as in the prior art, the present invention adjusts the bias such that the MR read head operates in a region of higher gain to increase the signal power. Any residual increase in noise power due to increasing the non-linearity is then attenuated using the non-linear correction circuit 22. The optimum operating setting for the biasing field of the MR read head is determined through an iterative calibration process which attempts to minimize an accumulated error metric. A channel quality circuit 38 processes the equalized signal samples 30 to generate a squared sample error metric, as well as the estimated binary sequence 40 detected by the trellis sequence detector 32 to generate a bit error metric. By iteratively adjusting the sensor in the read head and concurrently adjusting the non-linear correction circuit 22, an optimum sensor setting which minimizes the accumulated error metric is determined and then used during normal operation of the disk storage system.

Figure 5A:
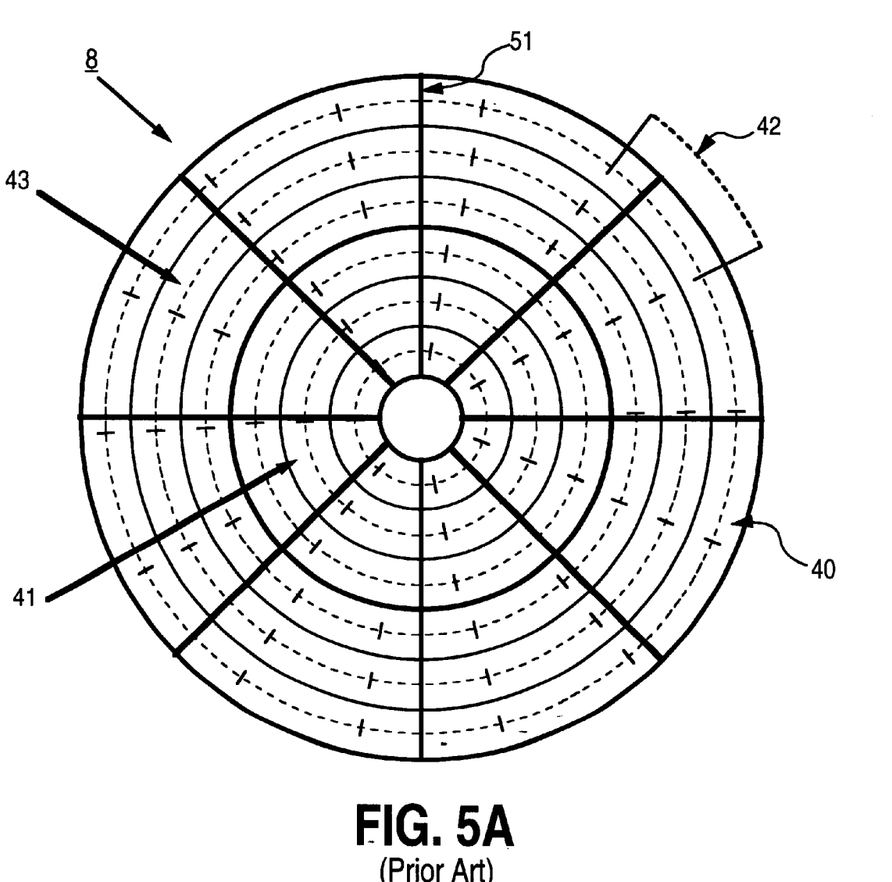
FIG. 5A shows a typical data format for a magnetic disk storage medium, comprising a plurality of concentric data tracks grouped in predefined zones, where each data track is partitioned into a number of data sectors.
Figure 5B:
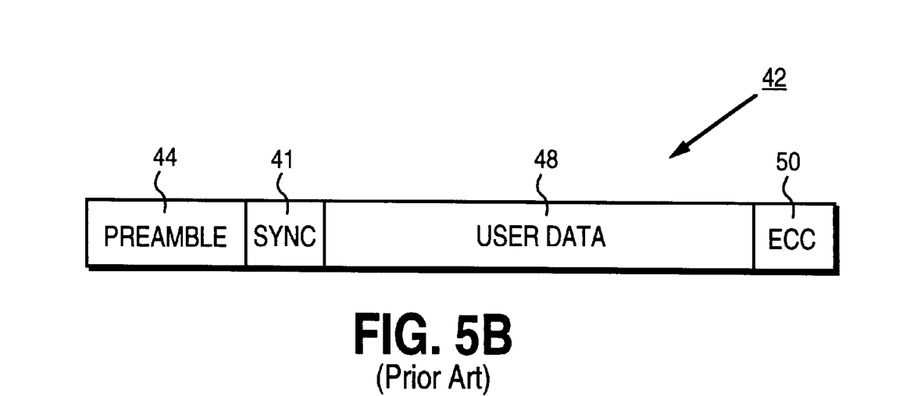
FIG. 5B shows a typical format for a data sector.

The iterative calibration processes is carried out for each zone of the disk. Zoned recording is a technique used to increase the storage capacity of the disk by achieving a substantially constant linear bit density from the inner diameter tracks to the outer diameter tracks. As shown in FIG. 5A, each track 40 on the disk 8 is divided into a predetermined number of sectors 42, where each sector 42 comprises a preamble 44, a sync mark 46, a number of user data bytes 48, and a number of ECC bytes 50 as illustrated in FIG. 5B. Servo sectors 51 are embedded within the tracks on the disk and comprise track and sector identification data, as well as servo bursts for fine positioning of the transducer over a centerline of a target data track during read and write operations.

Since the circumference of the outer diameter tracks is greater than that of the inner diameter tracks, the outer diameter tracks have more storage capacity. To take advantage of this storage capacity, the disk is partitioned into a number of zones where each zone comprises a predetermined number of tracks. The data rate is increased from the inner diameter zones to the outer diameter zones so that more data is stored in the outer diameter zones. This is illustrated in FIG. 5A which shows a disk partitioned into an inner zone 41 comprising seven sectors per track and an outer diameter zone 43 comprising fourteen sectors per track. In practice, the disk is actually partitioned into several zones so that the data rate and number of sectors gradually increases from the inner diameter to outer diameter zones, thereby utilizing the maximum storage capacity of the disk.

Because the data rate and other system dynamics change from zone to zone, the present invention determines an optimum sensor setting for each zone. These sensor settings are saved in memory and when the read head crosses over into a new zone during normal operation, the storage system loads the appropriate sensor setting into the sensor adjust circuit 11 of FIG. 4. Similarly, a nominal or calibrated setting for the coefficient a may also be loaded into the non-linear correction circuit 22 when the read head crosses over into a new zone.

Non-linear Correction Circuit

As stated above, the LMS update for the coefficient a in the non-linear correction circuit 22 of FIG. 4 is estimated using the stochastic gradient computed for the center coefficient in the quadratic component of a Volterra filter, without actually implementing a Volterra filter. A Volterra filter comprises a linear component $H_1(z)$ for attenuating linear distortions, and at least one higher order component, for example, a second order component $H_2(z_1,z_2)$ capable of attenuating non-linear distortions, such as asymmetry caused by the non-linear response of an MR read head. The linear component $H_1(z)$ of a Volterra filter can be implemented as a conventional finite-impulse-response (FIR) filter comprising a vector of coefficients C (e.g., the discrete-time equalizer 20 of FIG. 4), and the non-linear second order component $H_2(z_1,z_2)$ can be implemented as an nxn matrix of coefficients $C_{nxn}$. The output $y_k$ of the Volterra filter can be written as $$y_k = H_1(z) + H_2(z_1,z_2) = C^T X_k + X_k^T C_{nxn} X_k$$

where $X_k$ is a vector of the input samples. The coefficients for both the linear component $H_1(z)$ and the non-linear component $H_2(z_1,z_2)$ could be updated by a least-mean-square (LMS) adaptation circuit which adjusts the coefficients C and $C_{nxn}$ in a manner that minimizes a squared error $e_k$ computed as the difference between the sample values $y_k$ output by the Volterra filter and estimated ideal sample values $\hat{S}_k$ corresponding to the desired output (i.e., the target partial response). A simple slicer circuit can be used to generate the estimated ideal sample values $\hat{S}_k$ by comparing the output samples of the Volterra filter to thresholds which represent the decision boundaries for the ideal partial response signal samples.

A minimum mean-square-error (MMSE) algorithm which minimizes an expected squared error function $$V(H_1,H_2)=E[(y_k-\hat{S}_k)^2]$$

can be used to update the coefficients of the Volterra filter. The gradient of V with respect to $C_n$ (the nth coefficient in the linear filter $H_1(z)$) is $$\frac{\partial V}{\partial C_n} = E\left[2(y_k - \hat{S}_k)\frac{\partial \hat{y}_k}{\partial C_n}\right] = 2E[e_k X_{k-n}]$$

where $e_k$ is the error value $y_k-\hat{S}_k$. The LMS algorithm, otherwise known as the stochastic gradient algorithm, updates the coefficient $C_n$ by removing the expectation operator E from the above gradient equation and following the residual gradient estimate to the minimum of V $$c_n^{(m+1)}=c_n^{(m)}-\mu 2e_k X_{k-n}.$$

A similar computation leads to the LMS update algorithm for the non-linear second order component $H_2(z_1,z_2)$ of the Volterra filter. The MMSE stochastic gradient equation for $H_2(z_1,z_2)$ is $$\frac{\partial V}{\partial H_2(i,j)} = E\left[2e_k \frac{\partial \hat{y}_k}{\partial H_2(i,j)}\right] = E[2e_k X_{k-i} X_{k-j}]$$

which leads to an LMS stochastic gradient equation of $$H_2^{(m+1)}(i,j)=H_2^{(m)}(i,j)-\mu 2e_k X_{k-i} X_{k-j}.$$

Updating the non-linear second order component $H_2(z_1, z_2)$ of a Volterra filter using the above equation is relatively complex and expensive to implement depending on the design constraints for a particular storage system. For example, a second order component $H_2$ comprising a 5×5 matrix of coefficients requires 20 multiplies and 14 accumulates for every update. Therefore, instead of implementing a full Volterra filter to attenuate the non-linear distortions in the read signal, the present invention provides an alternative embodiment which significantly reduces the cost and complexity by implementing the non-linear correction circuit in the analog domain, while still performing the LMS update procedure in discrete-time using the LMS update for a Volterra filter.

The "center" coefficient of the nxn second order component $H_2(z_1,z_2)$ of the Volterra filter, defined as the center coefficient $H_2(d,d)$ on the diagonal of the nxn matrix, is a consistent indicator of the second order asymmetry distortion caused by an MR read head. If the center coefficient $H_2(d,d)$ is positive, it means that the Volterra equalizer needs to add a portion of $X^2_{k-d}$ to $\hat{S}_k$ when the MR asymmetry is under-corrected. Conversely, if the center coefficient $H_2(d,d)$ is negative, it means that the Volterra equalizer needs to subtract a portion of $X^2_{k-d}$ from $\hat{S}_k$ when the MR asymmetry is over-corrected. Therefore, the stochastic gradient update for the center coefficient $H_2(d,d)$ can be integrated and the integral representing the MR asymmetry error can be used to update the non-linear correction circuit 22. From the above LMS equation, the stochastic gradient update for the center coefficient $H_2(d,d)$ is computed as $$\frac{\partial V}{\partial H_2(d,d)} = \mu 2e_k X^2_{k-d}$$

The stochastic gradient update is then integrated by a discrete-time accumulator, and the integral used to adaptively tune the analog non-linear correction circuit 22.

Figure 6:
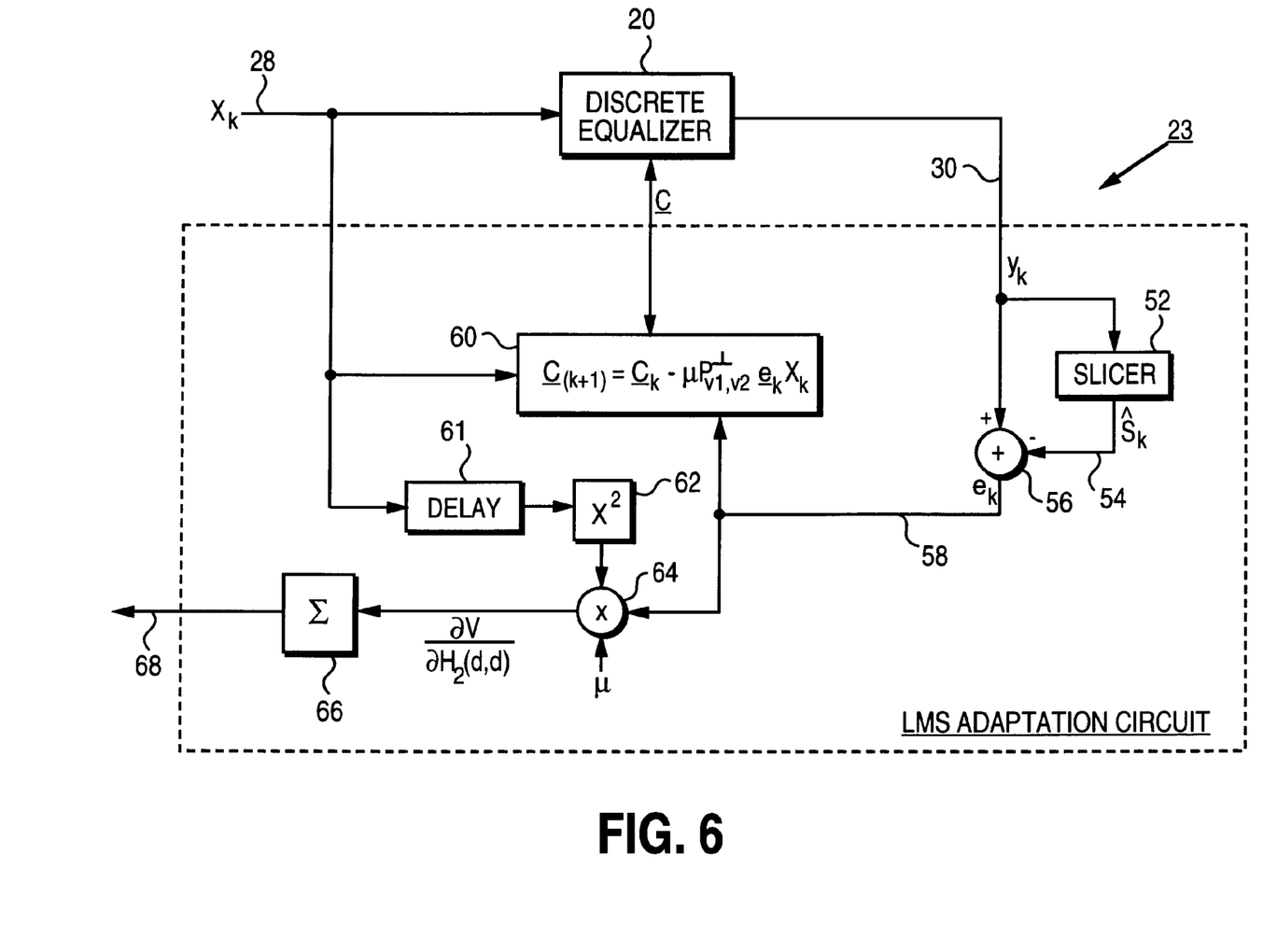
FIG. 6 shows further details of the LMS adaptation circuit for updating the linear equalizer and the analog non-linear correction circuit of the read channel, including an orthogonal projection operation for constraining the phase delay and gain of the linear equalizer.

Details of the LMS adaptation circuit 23 of FIG. 4 are shown in FIG. 6. The discrete-time sample values $X_k$ 28 at the input to the discrete equalizer 20 as well as the equalized samples 30 are input into the adaptation circuit 23. A slicer 52 processes the equalized samples 30 to generate estimated samples $\hat{S}_k$ 54 corresponding to ideal samples of the target partial response. The estimated samples $\hat{S}_k$ 54 are subtracted 56 from the equalized signal samples $y_k$ 30 of the read signal to generate a sample error signal $e_k$ 58. The pre-equalized signal samples $X_k$ 28 and the error signal $e_k$ 58 are input into a constrained stochastic gradient circuit 60 for implementing the above LMS equation for the linear component $H_1(z)$ of a Volterra filter, that is, for the linear discrete-time equalizer 20. The phase response of the discrete-time equalizer 20 is constrained using an orthogonal projection operation $Pv_1v_2^\perp$ so that the stochastic gradient update for the center coefficient $H_2(d,d)$ can be accurately computed relative to the equalizer's group delay. For further details concerning the orthogonal projection operator $Pv_1v_2^\perp$, see the above referenced co-pending patent application entitled "GAIN AND PHASE CONSTRAINED ADAPTIVE EQUALIZING FILTER IN A SAMPLED AMPLITUDE READ CHANNEL FOR MAGNETIC RECORDING."

The pre-equalized signal samples $X_k$ 28 are also passed through a delay element 61 to generate the sample value $X_{k-d}$. The delayed sample value $X_{k-d}$ is then squared 62, and the squared sample value $X^2_{k-d}$ multiplied 64 by the error signal $e_k$ 58 and a gain value $\mu$ to implement the above equation $$\frac{\partial V}{\partial H_2(d,d)} = \mu 2e_k X^2_{k-d}.$$

The output of the above equation is then integrated by a discrete time accumulator 66 to generate the update value 68 for the analog non-linear correction circuit 22 of FIG. 4.

The analog non-linear correction circuit 22 is designed to approximate the inverse response of the non-linearity in the read signal, thereby cancelling the non-linear distortion. Since the non-linear response of an MR read head is dominated by a second order component, the inverse response $f^{-1}(x)$ can be approximated as a second order polynomial of the form $$f^{-1}(x)=x+\alpha x^2.$$

The above inverse response is considered "two-sided" since it will add a second order compensation factor into both the positive and negative pulses in the read signal. However, the non-linearity may be biased toward distorting only the positive or negative pulses, in which case it may be better to employ a "one-sided" inverse response of the form:

$$f^{-1}(x) = \begin{cases} x & x \geq 0 \\ x+\alpha x^2 & x < 0 \end{cases} \text{ or}$$

-continued $$f^{-1}(x) = \begin{cases} x + ax^2 & x \geq 0 \\ x & x < 0 \end{cases}$$

depending on whether the distortion affects the negative or positive pulses, respectively. The coefficient α is adaptively tuned using the integrated stochastic gradient 68 for the center coefficient in the second order factor of the Volterra filter, as described above, in order to minimize the deviation (the error $e_k$ 58) of the read signals response from the desired partial response.

Figure 7A:
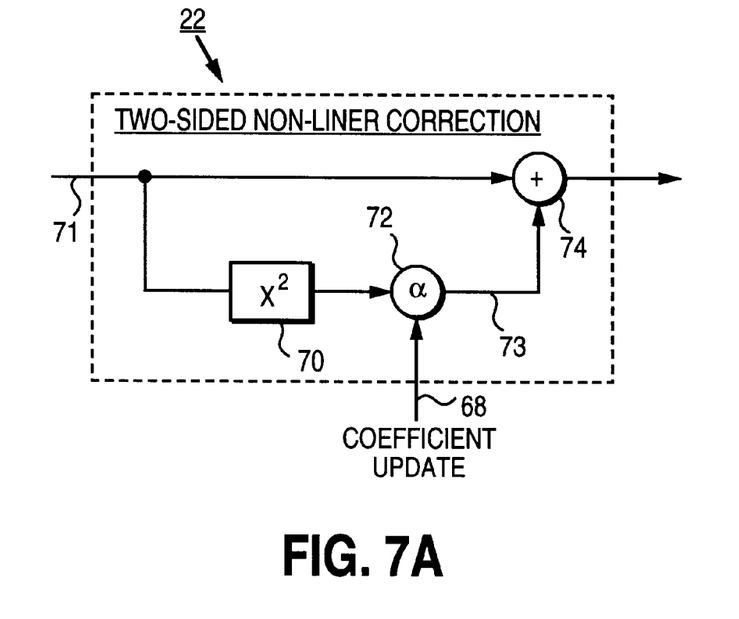
FIG. 7A shows details of a two-sided non-linear correction circuit implemented in the analog domain.
Figure 7B:
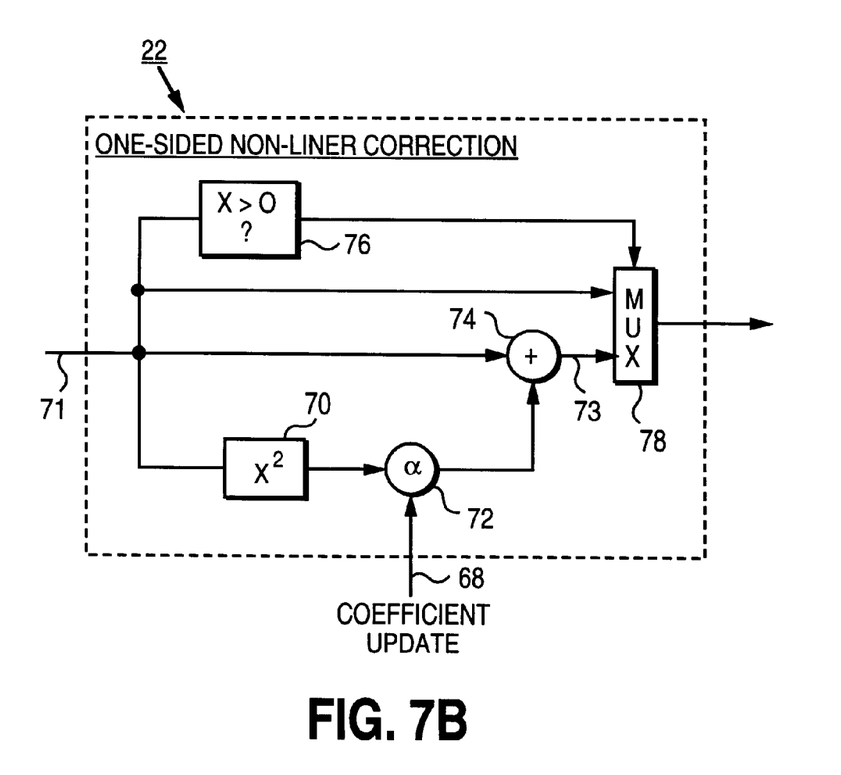
FIG. 7B shows details of a one-sided non-linear correction circuit implemented in the analog domain.

The circuitry for implementing the one-sided inverse response is shown in FIG. 7A. The analog read signal 71 output by the VGA 16 is squared by analog squarer 70, and the squared signal is then scaled by the coefficient α 72 which is adaptively tuned by the integrated stochastic gradient 68 generated by the LMS adaptation circuit 23 of FIG. 6. The scaled, squared read signal 73 is then added to the read signal 71 at adder 74 to implement the above two-sided inverse response. The circuitry for implementing the one-sided inverse response is shown in FIG. 7B, which is essentially the same as that of FIG. 7A except for the addition of a comparator for comparing the analog read signal to zero at comparator 76. The result of the comparison is used as the control signal to multiplexer 78 for selecting either the unmodified analog read signal, or the analog read signal after second order compensation, as the output of the non-linear correction circuit.

Iterative Sensor Calibration

An aspect of the present invention is to determine an optimal setting for the non-linear sensor in the read head in terms of maximizing the SNR. When using an MR read head, for example, the optimal operating region may not necessarily be in the most linear region of its response. As shown in FIG. 3, there may be a region that provides higher gain (i.e., increased signal power) even though it may be a region of higher non-linearity (i.e., higher noise power). In addition, FIG. 3 illustrates that extending the operating region over more of the response may also provide more signal gain even though it may increase the non-linearity. In the present invention, the non-linear correction circuit 22 attenuates the non-linearity—therefore biasing the MR sensor element in the higher gain region (or extending the region) and compensating for the increased non-linearity may provide an increase in the overall SNR.

Referring again to FIG. 4, a channel quality circuit 38 is integrated into the read channel to assist in finding the optimal sensor setting communicated to the sensor adjust circuit 11. The channel quality circuit 38 measures and accumulates a predetermined error metric associated with the read signal; for example, the channel quality circuit 38 may measure and accumulate squared sample errors or bit errors. During calibration the error metric is measured over a range of sensor settings and the setting that generates the minimum error metric is saved and used as the operating setting during normal operation.

Figure 8:
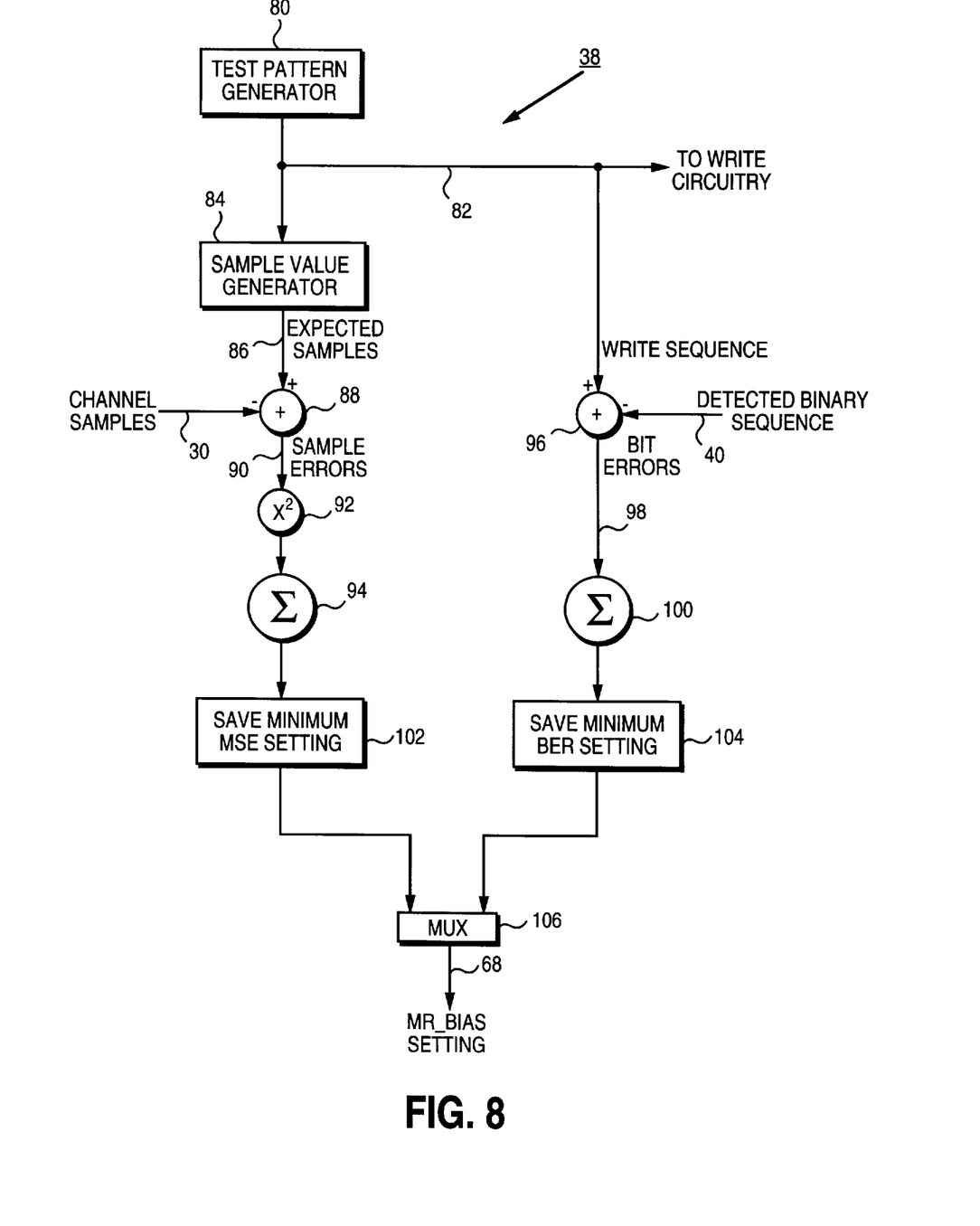
FIG. 8 shows details of the channel quality circuit for measuring and accumulating a squared error metric or a bit error metric for use in calibrating the non-linear sensor to find an optimum operating setting for each zone on the disk.

The channel quality circuit 38, as shown in FIG. 8, comprises a test pattern generator 80 for generating a test pattern 82 written to the disk when calibrating for the optimal non-linear sensor setting. The test pattern generator 80 preferably comprises a linear feedback shift register (LFSR) for generating a pseudo-random sequence of data. The benefit of using a known test pattern during calibration is that during read back the test pattern 82 can be used to accurately generate the desired error metric. In the embodiment shown in FIG. 8, the channel quality circuit 38 comprises a sample value generator 84 which converts the test pattern 82 into a sequence of expected sample values 86 corresponding to the target partial response. The expected samples 86 are then subtracted from the read signal samples 30 at adder 88 to generate a sequence of sample errors 90. The sample errors are then squared 92 and the squared sample errors accumulated 94 to generate a mean squared error (MSE) error metric. Alternatively, the test pattern 82 is subtracted from the detected binary sequence 40 at adder 96 to generate a sequence of bit errors 98, and the bit errors 98 are accumulated 100 to generate an accumulated bit error rate (BER) metric. For further details concerning the implementation of a channel quality circuit integrated into a sampled amplitude read channel see the above referenced U.S. Pat. No. 5,754,353.

Figure 9:
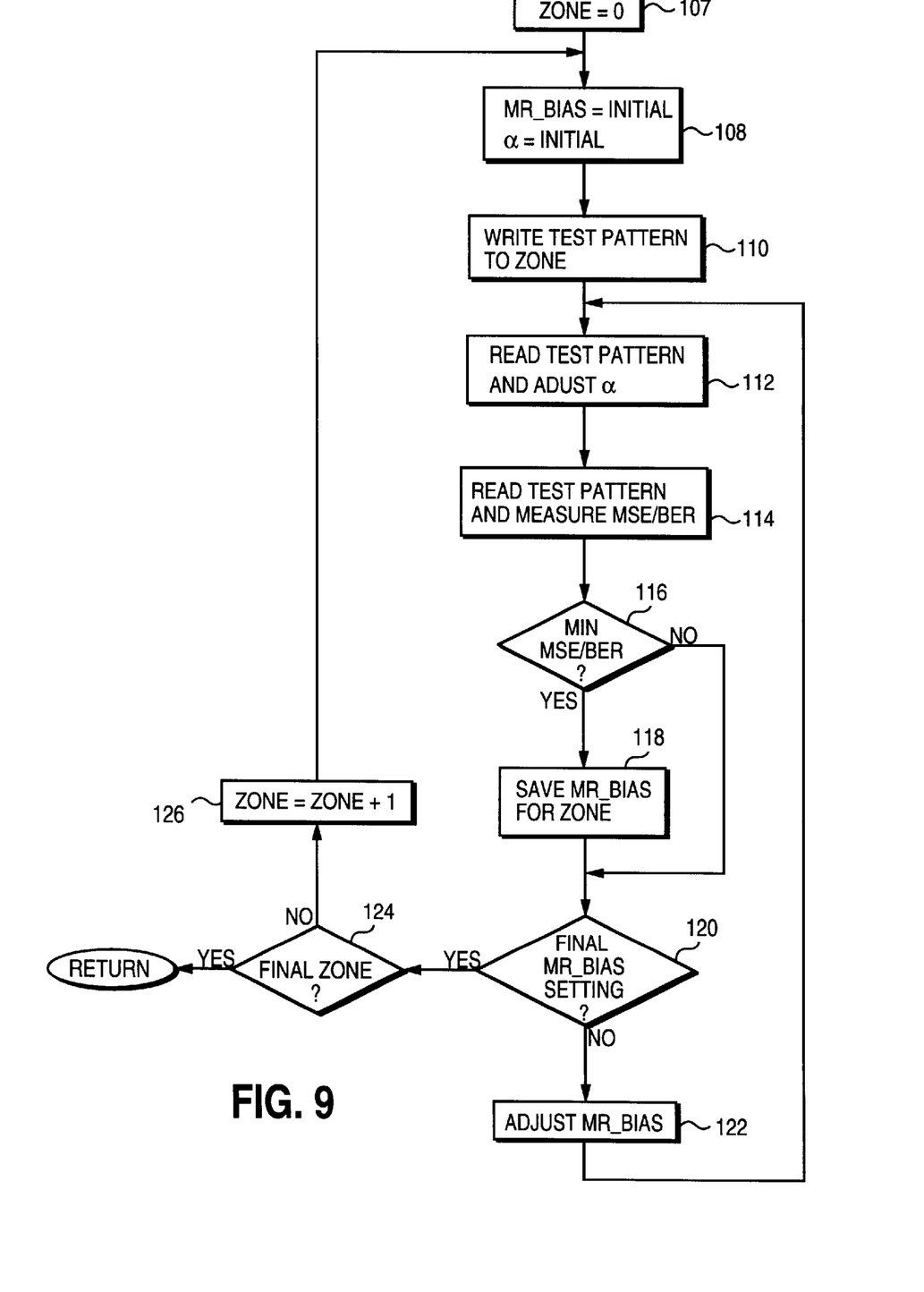
FIG. 9 is a flow diagram illustrating the iterative calibration procedure of the present invention for calibrating the optimum setting for the non-linear sensor in each zone of the disk.

The channel quality circuit 38 is illustrated in FIG. 8 as comprising circuitry for saving the non-linear sensor setting that generates either the minimum MSE error metric 102 or the minimum BER error metric 104, and a multiplexer 106 for transmitting the optimal setting 68 to the sensor adjust circuit 11. However, in the preferred embodiment the channel quality circuit 38 merely generates and transmits the accumulated error metric (MSE or BER) to a disk controller (not shown). The disk controller executes a calibration program which iteratively programs the non-linear sensor over a range of settings for each zone on the disk, and evaluates the accumulated error metrics to determine the optimal sensor setting for each zone. A flow diagram for the calibration program executed by the disk controller is shown in FIG. 9.

At step 107, a variable ZONE is initialized to the first zone on the disk (i.e., to zone zero). Then at step 108, the non-linear sensor setting (e.g., the MR bias setting) and the coefficient α in the non-linear correction circuit 22 are initialized to a nominal setting, and at step 110 the test pattern generated by the channel quality circuit 38 is written to the disk at the current zone. At step 112 the test pattern is read from the disk and the coefficient α is concurrently adjusted to attenuate the non-linearity in the read signal caused by the non-linear sensor. Once the coefficient α has settled sufficiently, the test pattern is read from the disk at step 114 and the channel quality circuit 38 measures and accumulates the error metric (e.g., the MSE or BER error metric). At step 116 the measured error metric is compared to the current minimum error metric, and if smaller, then the current non-linear sensor setting (e.g., MR bias setting) is saved at step 118 for the current zone. If at step 120 it is not the last sensor setting, then the sensor setting (e.g., MR bias) is adjusted at step 122 and the calibration processes starting at step 112 is re-iterated. This loop is re-iterated until an error metric has been measured for each sensor setting over a range of selected settings. The sensor setting that generates the minimum error metric (saved at step 118) is then stored in memory for the current zone. Then at step 124, if there are more zones to calibrate the ZONE variable is incremented at step 126 and the entire calibration program is re-executed starting at step 108.

During normal operation the sensor settings stored in memory are transmitted to the sensor adjust circuit 11 corresponding to the current zone the read head is operating over. When the read head transitions into a new zone, the corresponding sensor setting is read from memory and used as the new sensor setting for that zone (see the above description of zoned recording with reference to FIG. 5A). Thus, by adjusting the non-linear sensor to a region of higher gain and compensating for any increase in non-linearity in the read signal using an adaptive non-linear correction circuit, the present invention can increase the SNR and thereby increase the performance of the storage system as compared to the prior art practice of operating the non-linear sensor in the most linear region of its response.

Nominal α Setting

As described above with reference to the flow diagram of FIG. 9, at step 108 the coefficient α in the non-linear correction circuit 22 is initialized to a nominal setting before allowing it to adapt to the optimal setting while reading the test pattern from the disk. It is desirable (but not necessary) to initialize the coefficient α as near as possible to the optimal setting so that it converges quickly during the adaptation process. In the present invention, a particular technique is disclosed for estimating a nominal initial setting for the coefficient α for each zone which is then used in the calibration procedure described above.

It is known that the output of a specific function f(x) comprises even and odd order components. It is also known that the even or odd order components can be extracted from the output of a specific function f(x), that is, the even $f_e(x)$ and odd $f_o(x)$ order components of a function f(x) are defined as $$f_e(x)=f(x)+f(-x)$$

$$f_o(x)=f(x)-f(-x).$$

As described above, the non-linearity of a MR read head is estimated as a second order polynomial of the form $$f(x)=x+\alpha x^2.$$

Dividing the even order component of f(x) by the odd order component squared and divided by 2 results in the coefficient α. That is, $$\frac{f_e(x)}{(f_o(x))^2/2} = \frac{f(x)+f(-x)}{(f(x)-f(-x))^2/2} = \frac{2\alpha x^2}{(4x^2)/2} = \alpha.$$

Therefore, in the present invention a nominal initial setting for the coefficient α for use in the non-linear correction circuit 22 can be estimated using the above equation. All that is needed is to generate f(x) and f(−x) by reading an appropriate data pattern from the disk with the non-linear correction circuit 22 disabled, and then to calculate the coefficient α by substituting the samples of the read signal into the above equation.

One way to generate f(x) and f(−x) is to read a periodic signal recorded on the disk in each zone. If f(x) is a periodic signal with a period of 4T (where 1/T is the baud rate), then $$f(x)=f(x+4T)$$

$$f(-x)=f(x+2T).$$

A 2T preamble pattern recorded on the disk will generate a periodic sinusoid of period 4T. The baud rate synchronous (noiseless) samples 28 at the input to the discrete equalizer 20 corresponding to a 2T preamble pattern are $$\{\ldots -j,-j,+k,+k,-j,-j,+k,+k \ldots\}$$

where the magnitude of j differs from the magnitude of k due to the non-linear distortion of the MR read head. Thus, f(x) can be represented as the above sample sequence and f(−x) can be represented as the above sample sequence delayed by two symbol periods (i.e., by 2T). Substituting the above sample sequence (i.e., f(x)) and a delayed version of the above sample sequence (i.e., f(−x)) into the above equation provides a good estimate for the nominal initial setting for the coefficient α. The estimate for the coefficient α improves with longer sample sequences since other channel noise is attenuated through averaging.

As just described, the nominal estimate for the coefficient α computed according to the above equation for each zone on the disk may be used to initialize the non-linear correction circuit 22 before calibrating for the optimal sensor setting. In addition, the above nominal estimate may also be used as an initial setting for the coefficient α at the beginning of each read operation during normal operation of the storage device, and then allow the adaptation circuit 23 to adapt the coefficient α as a sector is being read. Alternatively, the above nominal estimate for the coefficient α may be used as a static operating setting rather than adapting the coefficient α while reading a sector during normal operation. In still another embodiment, an optimal operating setting for the coefficient α in each zone can be determined from the above calibration procedure. For example, the steady state value of the coefficient α after reading the test pattern from a particular zone could be used as the optimal operating setting during normal operation for that zone.

The objects of the invention have been fully realized through the embodiments disclosed herein. Those skilled in the art will appreciate that the various aspects of the invention can be achieved through different embodiments without departing from the essential function. For example, the aspects of the present invention could be applied to attenuate non-linear distortions in the read signal other than those caused by the non-linear response of an MR read head. In other alternative embodiments, error metrics other than mean squared error or bit error rate might be measured and accumulated for use in calibrating the optimal sensor setting. Still further, those skilled in the art understand that other non-linear correction circuits could be used in place of the disclosed second order polynomial which approximates the inverse non-linearity of an MR read head. With giant MR (GMR) heads, for example, the dominant non-linearity may be higher order (e.g., third order) in which case the non-linear correction circuit may comprise a higher order polynomial (e.g., a cubic polynomial). Further, in the preferred embodiment disclosed herein the non-linear correction circuit has been described as being real-time adaptive; however, the present invention is not limited in this respect. In an alternative embodiment, the non-linear correction circuit and sensor could both be calibrated "statically" by performing an exhaustive (or gradient) search over the different possible parameter permutations and then selecting the parameters that minimize the measured error metric. In yet another alternative embodiment, the sensor could be adapted in real time while searching for the coefficient setting in the non-linear correction circuit that minimizes the measured error metric. In still another alternative embodiment, both the non-linear correction circuit and the sensor could be adapted in real time simultaneously to find the optimum parameter settings that minimize the measured error metric. Thus, the particular embodiments disclosed are illustrative and not meant to limit the scope of the invention as appropriately construed from the following claims.

We claim:

1. A sampled amplitude read channel for reading data recorded on a magnetic disk storage medium, the sampled amplitude read channel comprising:

(a) a sampling device for sampling an analog read signal to generate a sequence of discrete-time sample values;

(b) a transducer comprising a non-linear sensor for transducing magnetic transitions recorded on the storage medium into pulses in the analog read signal, wherein:
  a response of the non-linear sensor comprises a low gain region and a high gain region; and
  a non-linearity of the sensor is greater in the high gain region than in the low gain region;

(c) a sensor adjust circuit for adjusting the non-linear sensor to operate in the high gain region of the sensor's response;

(d) a non-linear correction circuit for correcting a non-linearity in the analog read signal associated with the non-linearity of the sensor; and (e) a sequence detector for detecting the estimated binary sequence from the sequence of discrete-time sample values.

2. The sampled amplitude read channel as recited in claim 1, further comprising an adaptation circuit, responsive to the discrete-time sample values, for adjusting a parameter of the non-linear correction circuit.

3. The sampled amplitude read channel as recited in claim 1, further comprising a channel quality circuit for measuring an error value representing a performance level of the read channel, the error value for use in controlling the sensor adjust circuit.

4. The sampled amplitude read channel as recited in claim 3, wherein the channel quality circuit comprises a sample error generator for generating a sample error as a difference between the discrete-time sample values of the analog read signal and expected sample values of an ideal partial response signal.

5. The sampled amplitude read channel as recited in claim 4, wherein:
  (a) the channel quality circuit further comprises a squarer for squaring the sample error and an accumulator for accumulating the squared sample errors; and
  (b) the sensor adjust circuit adjusts the non-linear sensor to operate near the high gain region in order to minimize the accumulated squared sample errors.

6. The sampled amplitude read channel as recited in claim 3, wherein the channel quality circuit comprises a bit error generator for generating a bit error as a difference between the estimated binary sequence detected by the sequence detector and a test pattern recorded on the disk storage medium.

7. The sampled amplitude read channel as recited in claim 6, wherein:
  (a) the channel quality circuit further comprises an accumulator for accumulating the bit errors; and
  (b) the sensor adjust circuit adjusts the non-linear sensor to operate near the high gain region in order to minimize the accumulated bit errors.

8. The sampled amplitude read channel as recited in claim 3, wherein the channel quality circuit comprises a test pattern generator for generating a test pattern recorded on the disk storage medium, wherein the measured error value is generated in response to the test pattern when read from the disk.

9. The sampled amplitude read channel as recited in claim 1, wherein the non-linear correction circuit comprises:
  (a) an analog squaring circuit for squaring the analog read signal to generate a squared analog signal; and
  (b) a multiplier for multiplying the squared analog signal by a coefficient to generate a scaled correction signal.

10. The sampled amplitude read channel as recited in claim 9, wherein the non-linear correction circuit further comprises an adder for adding the analog read signal to the scaled correction signal to generate a corrected analog read signal.

11. The sampled amplitude read channel as recited in claim 1, further comprising a means for computing a nominal setting for a coefficient of the non-linear correction circuit.

12. A method of reading data recorded on a magnetic disk storage medium by detecting an estimated binary sequence from a sequence of discrete-time sample values generated by sampling an analog read signal, the method comprising the steps of:

(a) transducing magnetic transitions recorded on the storage medium into pulses in the analog read signal using a non-linear sensor, wherein:
  a response of the non-linear sensor comprises a low gain region and a high gain region; and
  a non-linearity of the sensor is greater in the high gain region than in the low gain region;

(b) adjusting the non-linear sensor to operate in the high gain region of the sensor's response; and (c) correcting a non-linearity in the analog read signal associated with the non-linearity of the sensor using a non-linear correction circuit.

13. The method of reading data recorded on a magnetic disk storage medium as recited in claim 12, wherein the non-linear correction circuit is adaptive, further comprising the step of adjusting a parameter of the non-linear correction circuit in response to the discrete-time sample values.

14. The method of reading data recorded on a magnetic disk storage medium as recited in claim 12, further comprising the step of measuring an error value representing a performance level of the read channel, the error value for use in the step of adjusting the non-linear sensor to operate in the high gain region of the sensor's response.

15. The method of reading data recorded on a magnetic disk storage medium as recited in claim 14, wherein the step of measuring an error value comprises the step of generating a sample error as a difference between the discrete-time sample values of the analog read signal and expected sample values of an ideal partial response signal.

16. The method of reading data recorded on a magnetic disk storage medium as recited in claim 15, further comprising the steps of:
  (a) squaring the sample error and accumulating the squared sample errors; and
  (b) adjusting the non-linear sensor to operate near the high gain region in order to minimize the accumulated squared sample errors.

17. The method of reading data recorded on a magnetic disk storage medium as recited in claim 14, wherein the step of measuring an error value comprises the step of generating a bit error as a difference between the estimated binary sequence and a test pattern recorded on the disk storage medium.

18. The method of reading data recorded on a magnetic disk storage medium as recited in claim 17, further comprising the steps of:
  (a) accumulating the bit errors; and
  (b) adjusting the non-linear sensor to operate near the high gain region in order to minimize the accumulated bit errors.

19. The method of reading data recorded on a magnetic disk storage medium as recited in claim 14, wherein the step of measuring an error value comprises the steps of generating a test pattern recorded on the disk storage medium and reading the test pattern from the disk storage medium.

20. The method of reading data recorded on a magnetic disk storage medium as recited in claim 12, where the step of correcting a non-linearity in the analog read signal associated with the non-linearity of the sensor comprises the steps of:

(a) squaring the analog read signal to generate a squared analog signal; and (b) multiplying the squared analog signal by a coefficient to generate a scaled correction signal.

21. The method of reading data recorded on a magnetic disk storage medium as recited in claim 20, wherein the step of correcting a non-linearity in the analog read signal associated with the non-linearity of the sensor further comprises the step of adding the analog read signal to the scaled correction signal to generate a corrected analog read signal.

22. The method of reading data recorded on a magnetic disk storage medium as recited in claim 12, further comprising the step of computing a nominal setting for a parameter of the non-linear correction circuit.

23. A method of reading data recorded on a magnetic disk storage medium by detecting an estimated binary sequence from a sequence of discrete-time sample values generated by sampling an analog read signal, the method comprising the steps of:

(a) reading data recorded on the disk using a non-linear sensor;

(b) correcting a non-linearity in the analog read signal associated with the non-linearity of the sensor;

(c) adjusting a parameter of the non-linear sensor to a sensor setting selected from a plurality of sensor settings;

(d) measuring an error value within the read channel in response to the discrete-time sample values;

(e) repeating steps (a) through (d) at least once;

(f) adjusting the parameter of the non-linear sensor to a sensor setting selected using the error values measured in step (d);

(g) generating a test pattern recorded on the disk storage medium; and (h) reading the test pattern from the disk storage medium, wherein the measured error value is generated in response to the test pattern read from the disk storage medium.

24. A sampled amplitude read channel for reading data recorded on a magnetic disk storage medium, the sampled amplitude read channel comprising:

(a) a sampling device for sampling an analog read signal to generate a sequence of discrete-time sample values;

(b) a transducer comprising a non-linear sensor for transducing magnetic transitions recorded on the storage medium into pulses in the analog read signal;

(c) a non-linear correction circuit for correcting a nonlinearity in the analog read signal associated with the non-linearity of the sensor, the non-linear correction circuit comprising a second order polynomial of the form $\alpha x^2 + x$ where $\alpha$ is a programmable coefficient;

(d) a means for computing a nominal setting for the programmable coefficient, comprising:

(i) a means for extracting an even component $f_e(x)$ and an odd component $f_o(x)$ of a function $f(x)$; and (ii) a means for computing $$\frac{f_e(x)}{(f_o(x))^2/2} = \frac{f(x)+f(-x)}{(f(x)-f(-x))^2/2} = \frac{2\alpha x^2}{(4x^2)/2} = \alpha; \text{ and}$$

(e) a sequence detector for detecting the estimated binary sequence from the sequence of discrete-time sample values.

25. The sampled amplitude read channel as recited in claim 24, wherein the programmable coefficient is programmed with the nominal setting prior to calibrating the non-linear correction circuit to determine an optimum setting for the programmable coefficient.

26. The sampled amplitude read channel as recited in claim 24, wherein the programmable coefficient is programmed with the nominal setting prior to reading a data sector recorded on the disk.

27. A method of reading data recorded on a magnetic disk storage medium by detecting an estimated binary sequence from a sequence of discrete-time sample values generated by sampling an analog read signal, the method comprising the steps of:

(a) reading data recorded on the disk using a non-linear sensor;

(b) correcting a non-linearity in the analog read signal associated with the non-linearity of the sensor, comprising the steps of:

(i) squaring the analog read signal to generate a squared analog signal; and (ii) multiplying the squared analog signal by a coefficient to generate a scaled correction signal;

(c) adjusting a parameter of the non-linear sensor to a sensor setting selected from a plurality of sensor settings;

(d) measuring an error value within the read channel in response to the discrete-time sample values;

(e) repeating steps (a) through (d) at least once; and adjusting the parameter of the non-linear sensor to a sensor setting selected using the error values measured in step (d).

28. The method of reading data recorded on a magnetic disk storage medium as recited in claim 27, wherein the step of correcting a non-linearity in the analog read signal associated with the non-linearity of the sensor further comprises the step of:

(iii) adding the analog read signal to the scaled correction signal to generate a corrected analog read signal.

* * * * *